United States Patent
Jung

(10) Patent No.: US 10,963,395 B2
(45) Date of Patent: Mar. 30, 2021

(54) MEMORY SYSTEM

(71) Applicant: SK hynix Inc., Icheon (KR)

(72) Inventor: Dong Ha Jung, Yongin (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/383,371

(22) Filed: Apr. 12, 2019

(65) Prior Publication Data

US 2020/0174942 A1 Jun. 4, 2020

(30) Foreign Application Priority Data

Nov. 30, 2018 (KR) .................. 10-2018-0152527

(51) Int. Cl.
| | |
|---|---|
| *G06F 3/06* | (2006.01) |
| *G06F 12/1009* | (2016.01) |
| *G06F 11/10* | (2006.01) |
| *G06F 12/0808* | (2016.01) |
| *G06F 12/02* | (2006.01) |

(52) U.S. Cl.
CPC ........ *G06F 12/1009* (2013.01); *G06F 3/0611* (2013.01); *G06F 3/0619* (2013.01); *G06F 3/0659* (2013.01); *G06F 11/1044* (2013.01); *G06F 12/0246* (2013.01); *G06F 12/0808* (2013.01); *G06F 3/0679* (2013.01); *G06F 2212/6026* (2013.01)

(58) Field of Classification Search
None
See application file for complete search history.

(56) References Cited

U.S. PATENT DOCUMENTS

| | | | |
|---|---|---|---|
| 7,206,902 B2 | 4/2007 | Hakura et al. | |
| 8,433,852 B2 | 4/2013 | Hu et al. | |
| 8,819,390 B1* | 8/2014 | Sivasubramanian | ........................ G06F 12/0862 709/202 |
| 2005/0195635 A1* | 9/2005 | Conley | ............... G06F 12/0862 365/149 |
| 2006/0041723 A1* | 2/2006 | Hakura | ............... G06F 12/0862 711/137 |
| 2014/0379995 A1* | 12/2014 | Kwon | ................. G06F 12/0862 711/137 |
| 2015/0039968 A1* | 2/2015 | Orion | .................. G06F 11/1076 714/766 |
| 2016/0055089 A1* | 2/2016 | Kim | ..................... G06F 12/0875 711/137 |

OTHER PUBLICATIONS

Somogyi, et al., "Spatio-Temporal Memory Streaming," ISCA, Proceedings of the 36th Annual International Symposium on Computer Architecture, 2009, pp. 12.

* cited by examiner

*Primary Examiner* — Charles Rones
*Assistant Examiner* — Han V Doan

(57) ABSTRACT

A memory system is disclosed, which relates to technology for reducing overhead in a high-capacity memory device. The memory system includes a host and at least one memory. The host generates memory information by profiling history information about a memory access pattern. The memory device predicts a pattern of data to be accessed at a subsequently accessed page in response to the memory information, generates subset data according to the predicted data pattern, and transmits the generated subset data to the host. The subset data is less than all the data of the subsequently accessed page, which improves the speed and efficiency of the memory system.

19 Claims, 9 Drawing Sheets

US 10,963,395 B2

MEMORY SYSTEM

CROSS-REFERENCE TO RELATED APPLICATION

This application claims priority based upon Korean patent application No. 10-2018-0152527, filed on Nov. 30, 2018, the disclosure of which is hereby incorporated in its entirety by reference herein.

BACKGROUND OF THE INVENTION

1. Technical Field

Embodiments of the present disclosure may generally relate to a memory system, and more particularly to a technology for reducing overhead in a high-capacity memory device.

2. Related Art

In recent times, various mobile communication terminals, for example, smartphones, tablet PCs, etc. have been widely used throughout the world. In addition, demand for a Social Network Service (SNS), a Machine to Machine (M2M) service, a sensor network, etc. from anywhere at any time is rapidly increasing. Therefore, the amount of data, the creation speed of data, and diversity of data are geometrically increasing. In order to process this large amount of diverse and rapidly-created data, a data processing rate of each memory is of importance and a high-capacity memory device and a high-capacity memory module are also needed.

Therefore, a memory system includes a plurality of unified memories to overcome physical limitations of each memory as well as to increase storage capacity of each memory. The memories of the memory system may be coupled to a controller by sharing data lines therebetween. However, since overhead occurs during data transmission between a host and the memories, a data transfer time may unavoidably increase.

BRIEF SUMMARY OF THE INVENTION

Various embodiments of the present disclosure are directed to providing a memory system that substantially obviates one or more problems due to limitations and disadvantages of the related art.

The embodiments of the present disclosure relate to a memory system for analyzing requests by a host, predicting data that may be subsequently accessed by the host, and transmitting data selected according to the prediction from among data of an entire page, thus reducing overhead.

In accordance with an embodiment of the present disclosure, a memory system includes a host configured to generate memory information by profiling history information about a memory access pattern, and at least one memory device configured to predict a data pattern of a page to be accessed by the host, using the memory information, generate subset data from the pate according to the predicted data pattern, and transmit the generated subset data to the host, wherein the subset data is less than all the data of the page.

In accordance with another embodiment of the present disclosure, a memory system includes a memory device, a memory profile circuit configured to generate memory information by profiling history information about a memory access pattern, and a data prediction circuit configured to predict a data pattern of a page to be accessed by the host, using the memory information, and generate subset data of the page according to the predicted data pattern wherein the subset data is less than all the data of the page.

It is to be understood that both the foregoing general description and the following detailed description of the present disclosure are illustrative and explanatory and are intended to provide further explanation of the disclosure as claimed.

BRIEF DESCRIPTION OF THE DRAWINGS

The above and other features and advantages of the present disclosure will become readily apparent by reference to the following detailed description when considered in conjunction with the accompanying drawings wherein.

DESCRIPTION OF EMBODIMENTS

Reference will now be made in detail to embodiments of the present disclosure, examples of which are illustrated in the accompanying drawings. Wherever possible, the same reference numbers are used throughout the drawings to refer to the same or like portions. Throughout the specification of the present disclosure, if it is assumed that a certain part is connected (or coupled) to another part, the term "connection or coupling" means that the certain part is directly connected (or coupled) to another part and/or is electrically connected (or coupled) to another part through the medium of a third party. Throughout the specification of the present disclosure, if it is assumed that a certain part includes a certain component, the term "comprising or including" means that a corresponding component may further include other components unless a specific meaning opposed to the corresponding component is written. As used in the specification and appended claims, the terms "a", "an", "one", "the" and other similar terms include both singular and plural forms, unless context clearly dictates otherwise. The terms used in the present application are merely used to describe specific embodiments and are not intended to limit the present disclosure. A singular expression may include a plural expression unless otherwise stated in the context.

Figure 1:
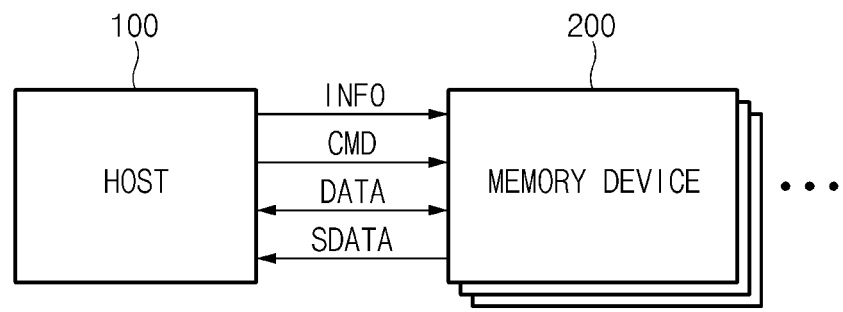
FIG. 1 is a block diagram illustrating a memory system according to an embodiment of the present disclosure.

FIG. 1 is a block diagram illustrating a memory system 10 according to an embodiment of the present disclosure.

The memory system 10 may include a host 100 and a plurality of memory devices 200. The host 100 may generate a control signal to control the memory devices 200. In accordance with one embodiment, the host 100 may generate memory information INFO, and may transmit the memory information INFO to the memory devices 200. The memory information INFO generated by the host 100 may include history information about a pattern used to access each of the memory devices 200. The memory information INFO generated by the host 100 may include memory region information. The memory region information may indicate how to classify all memories allocated to a process, and may indicate which one of usages is allocated to each of the classified memories. The host 100 may further include an interface (not shown) to interface with the memory devices 200.

The host 100 may generate a command signal CMD, and may transmit the command signal CMD to the memory devices 200. The command signal CMD may include one or more of a write command to write data in the memory devices 200, a read command to read stored data from the memory devices 200, and the like. In accordance with one embodiment, the host 100 may include a request command to request required data from among all the data stored in a page (to be described later) of each memory device 200.

The host 100 may transmit and receive data DATA to and from each of the memory devices 200. In other words, the host 100 may transmit data DATA to the memory devices 200 during a write operation, and may receive data DATA read from the memory devices 200 during a read operation. In an embodiment, the host 100 may receive subset data SDATA from among the data stored in a requested page (e.g., all the data stored in the requested page) of each memory device 200, as will be described subsequently.

In addition, the memory device 200 may provide data DATA in response to the command signal CMD received from the host 100. For example, the memory device 200 may store data received from the host 100 therein, or may read stored data and transmit the data that was read to the host 100.

The memory device 200 may receive memory information INFO from the host 100, may predict, based on the received memory information INFO, a data pattern for accesses to a subsequent page, and may generate subset data SDATA requested by the host 100 based on the received memory information INFO. Upon receiving from the host 100 the command signal CMD for reading data, the memory device 200 may transmit prepared subset data SDATA to the host 100.

The memory devices 200 according to the embodiment of the present disclosure may be a pooled memory system in which the same or different kinds of memories are provided in a unified form (or an integrated form). Any one selected from among the memory devices 200 may be accessed by a request of the host 100.

In addition, each of the memory devices 200 according to this embodiment may include a volatile memory, such as a Dynamic Random Access Memory (DRAM) or a Static Random Access Memory (SRAM). However, the scope or spirit of the present disclosure is not limited thereto, and each of the memory devices 200 may be implemented as any one of non-volatile memories, for example, a NAND flash memory, a NOR flash memory, a Phase-Change RAM (PRAM), a Ferroelectric RAM (FRAM), a Magnetic RAM (MRAM), etc., or may also be implemented as a combination thereof.

As described above, the memory system according to the embodiment may predict a data pattern of a page to be subsequently accessed in response to history information about a memory access pattern, and may generate subset data SDATA based on the predicted data pattern of the page. In addition, upon receiving a request from the host 100, the memory devices 200 may transmit the subset data SDATA to the host 100, instead of transmitting all the data of the page to the host 100. Therefore, the memory system according to the embodiment can greatly reduce a data transfer time and overhead as compared to a conventional memory system for transmitting data of all pages to a destination.

Figure 2:
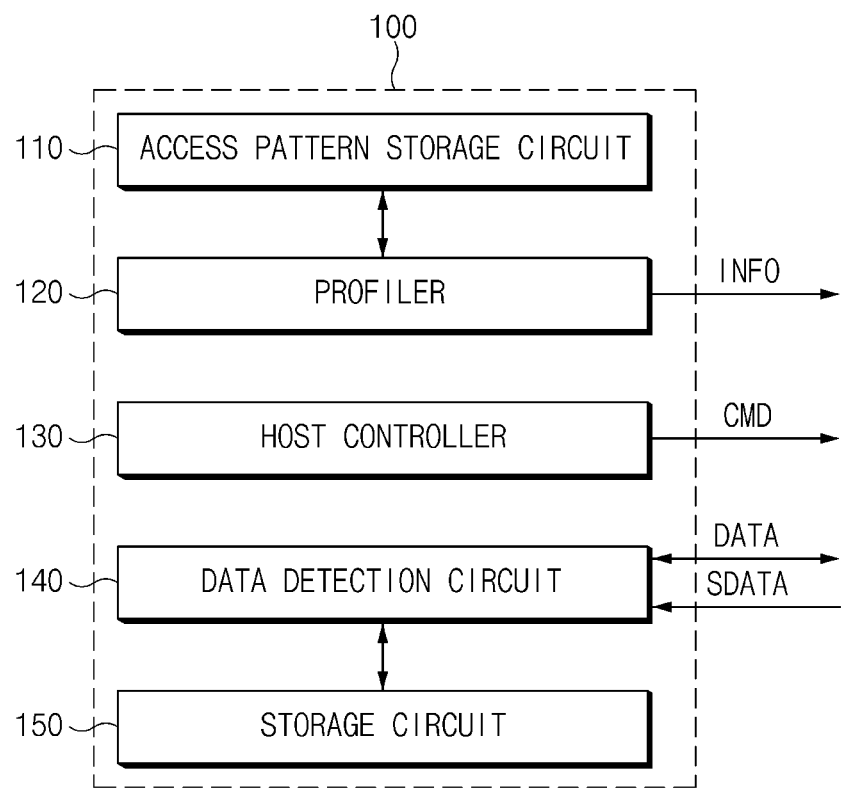
FIG. 2 is a block diagram illustrating a host according to an embodiment of the present disclosure.

FIG. 2 is a block diagram illustrating a host 100 according to an embodiment, such as the host 100 shown in FIG. 1.

The host 100 may include an access pattern storage circuit 110, a profiler 120, a host controller 130, a data detection circuit 140, and a storage circuit 150.

The access pattern storage circuit 110 may store history information of a memory access pattern of access to the memory devices 200 by the host 100.

The profiler 120 may include information about either a kernel level or an application level of memory regions of the memory devices 200, such that the profiler 120 may profile a memory access pattern based on the kernel level or application level information.

In addition, the profiler 120 may profile which pattern will be used by the host 100 accessing the memory devices 200. The profiler 120 may generate a profiled memory access pattern as memory information INFO, and may transmit the generated memory information INFO to the memory devices 200. The profiler 120 may generate information about a memory region accessed in the memory devices 200 as memory information INFO, and may transmit the memory information INFO to the memory devices 200.

The profiler 120 may analyze an inter-page access pattern or an intra-page access pattern, and may extract a memory access pattern based on the analyzed result.

For example, the profiler 120 may collect exception information that is generated after access protection for each page has been established, such that the profiler 120 may extract an inter-page access pattern based on the collected exception information. (That is, a protection mechanism (not shown) may be set to prohibit access to each page, so that an exception is generated when an attempt to access a previously un-accessed page is made. In response to the exception, access to the page is enabled, the access information is collected by the profiler 120, and the attempted access is then successfully completed.) In order to extract the inter-page access pattern, the profiler 120 may perform sampling of exception information for a specific time, and may then extract the inter-page access pattern using the sampling result. In addition, the profiler 120 may generate exception information about all pages, such that the profiler 120 may extract the intra-page access pattern based on the generated exception information. The page access pattern extracted from the profiler 120 may be stored in the access pattern storage circuit 110.

The host controller 130 may generate a command signal CMD for requesting subset data SDATA be accessed from among the data stored in each page of the memory devices 200. In other words, when a page requested by an application of the host 100 is present in the memory devices 200, the host controller 130 may generate a command signal CMD requesting that page, and may transmit the generated command signal CMD to the memory devices 200.

The data detection circuit 140 may receive the subset data SDATA requested from among the data stored in each page of the memory devices 200 (e.g., a subset of all the data in a page), and may detect data corresponding to a non-present cache line (that is, an absence of data for a memory region having an alignment and size corresponding to that of a cache line of the storage circuit 150) in the received subset data SDATA. In this case, when a present data region in the received subset data SDATA is accessed, the data detection circuit 140 may transmit the accessed subset data SDATA to the host controller 130.

The storage circuit 150 may store data DATA transmitted to or received from the data detection circuit 140. The storage circuit 150 may store subset data SDATA received through the data detection circuit 140.

Figure 3:
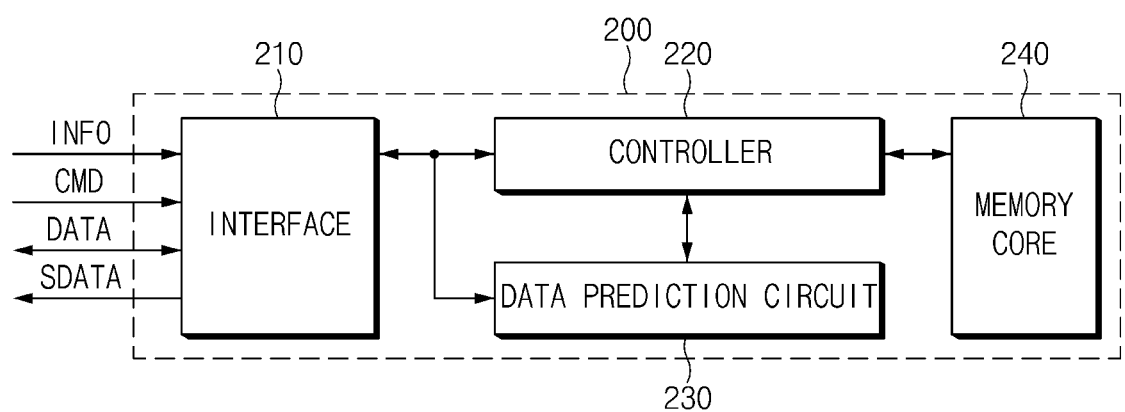
FIG. 3 is a block diagram illustrating a memory device according to an embodiment of the present disclosure.

FIG. 3 is a block diagram illustrating a memory device 200 according to an embodiment, such as each of the memory devices 200 shown in FIG. 1.

Each of the memory devices 200 may include an interface 210, a controller 220, a data prediction circuit 230, and a memory core 240.

The interface 210 may perform interfacing between the host 100 and the memory device 200. For example, the interface 210 may receive the memory information INFO and the command signal CMD from the host 100, and may transmit the memory information INFO and the command signal CMD to the controller 220 and the data prediction circuit 230. The interface 210 may receive data DATA and subset data SDATA from the controller 220 and the data prediction circuit 230, and may transmit the received data DATA and the received subset data SDATA to the host 100.

The controller 220 may analyze and process the command signal CMD received from the host 100. That is, upon receiving the command signal CMD from the host 100, the controller 220 may control operations of background functional blocks using firmware or software as needed to drive the memory core 240.

Upon receiving memory information INFO through the interface 210, the data prediction circuit 230 may predict, using profiled memory access pattern information, a data pattern of access to a subsequent page, and may generate subset data SDATA from the data within the subsequent page. The data prediction circuit 230 may extract data in consideration of a stride of the profiled memory access pattern information, and generate packetized subset data SDATA based on the extracted data. In this case, the term "stride" may refer to a distance between memory addresses. In another embodiment, the stride may refer to either a predicted stride or prediction of a memory address to be subsequently requested, and may be usefully used in prefetch.

The data prediction circuit 230 may predict a data pattern of access to a subsequent page through pattern learning. In this case, the term "pattern learning" may include a scheme for learning the existing address access history and searching for a pattern based on the learned result. For example, during pattern training, the data prediction circuit 230 may learn a necessary stride through a register (not shown) or may learn such a stride through machine learning, such that the data prediction circuit 230 may predict a data pattern of accesses to a subsequent page.

If the memory access pattern is considered unclear (or indefinite), the data prediction circuit 230 may prepare subset data SDATA by minimizing the number of false negatives. That is, when the memory access pattern is unclear (or indefinite) the data prediction circuit 230 may include additional data (beyond that clearly predicted by the memory access pattern) from each page in the generated subset data SDATA. In addition, when access regions are densely present in the page (that is, when a large fraction or threshold of the page is predicted to be accessed), the data prediction circuit 230 may transmit all the data of the page to the host 100. In an embodiment, the threshold of the page is 40 or greater, 50% or greater, 60% or greater, or 70% or greater, or 80% or greater, or 90% or greater. Upon receiving the command signal CMD through the interface 210, the data prediction circuit 230 may transmit the prepared subset data SDATA to the host 100 through the interface 210. When less than all the data of the page is transmitted to the host 100, the transmission of the prepared subset data SDATA to the host 100 may include an indication of the data pattern used to prepare the subset data SDATA. When all the data of the page is transmitted to the host 100, the transmission of the prepared subset data SDATA to the host 100 may include an indication of that all the data of the page is included in the subset data SDATA.

During the write operation, the memory core 240 may store data in a bank (not shown) under control of the controller 220. During the read operation, the memory core 240 may read stored data from the bank (not shown) under control of the controller 220.

Figure 4:
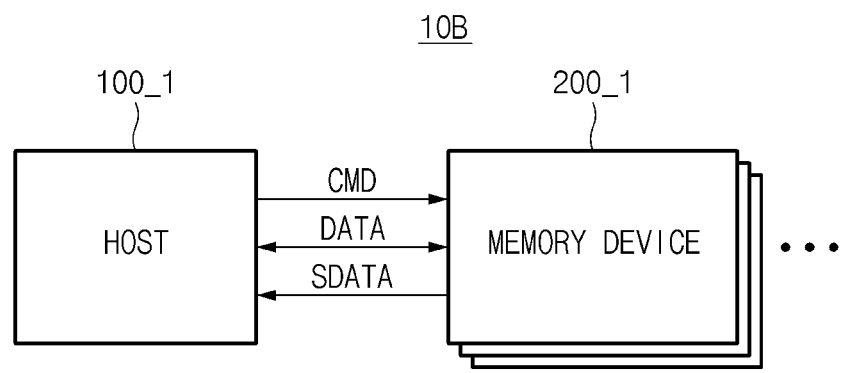
FIG. 4 is a block diagram illustrating a memory system according to another embodiment of the present disclosure.

FIG. 4 is a block diagram illustrating a memory system 10B according to another embodiment of the present disclosure.

The memory system 10B according to another embodiment of the present disclosure may include a host 100_1 and a plurality of memory devices 200_1.

The memory system 10B may allow an operation of profiling a memory access pattern to be processed in each of the memory devices 200_1 instead of the host 100_1. Therefore, unlike the host 100 of FIG. 1, the host 100_1 shown in FIG. 4 may not generate memory information INFO.

The remaining constituent elements and operations of the host 100_1 and the memory devices 200_1 are identical to those of FIG. 3, and as such a detailed description thereof will herein be omitted for convenience of description. In addition, the profile operation processed in the memory devices 200_1 will be described later.

Figure 5:
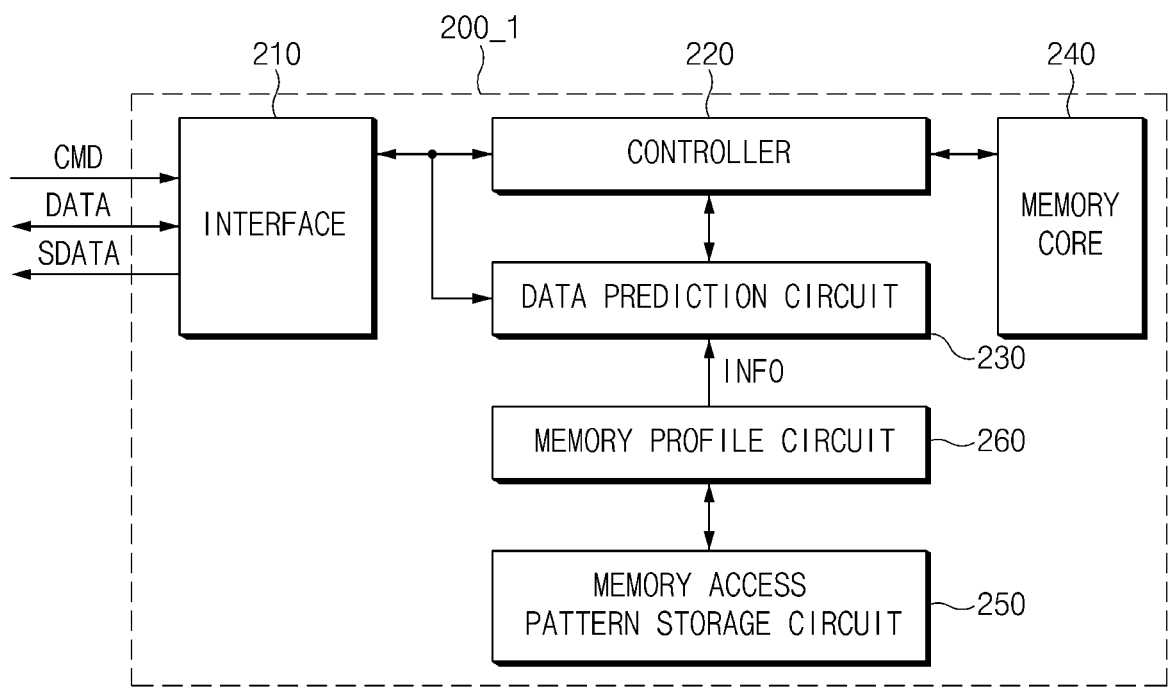
FIG. 5 is a block diagram illustrating a memory device according to another embodiment of the present disclosure.

FIG. 5 is a block diagram illustrating a memory device 200_1, such as one of the memory devices 200_1 shown in FIG. 4.

In addition to the interface 210, controller 220, data prediction circuit 230, and the memory core 240 of the memory device 200 of FIG. 3, the memory device 200_1 may further include a memory access pattern storage circuit 250 and a memory profile circuit 260.

The embodiment of FIG. 2 illustratively discloses that the host 100 includes the access pattern storage circuit 110 and the profiler 120 such that the profile operation of the memory access pattern is performed within the host 100. The embodiment of FIG. 5 discloses that the profile operation of the memory access pattern is performed in the memory devices 200_1. In another embodiment, the profile operation of the memory access pattern may be performed in the host and/or in the memory devices.

Referring back to FIG. 5, when the profile operation of the memory access pattern is performed in the memory devices 200_1, the controller 220 may receive a data request in units of a cache line from the host 100_1, without receiving a data request in units of a page from the host 100_1. In embodiments, a cache line may comprise, for example, 32, 64, 128, or 256 data bytes, but embodiments are not limited thereto.

The memory access pattern storage circuit 250 may store a memory access pattern in response to a stride occurring in a series of virtual addresses. That is, the application generating addresses in the host 100 may be generating virtual addresses. As a result, the memory access pattern storage circuit 250 may store a memory access pattern in response to virtual addresses received from the host 100. However, embodiments are not limited thereto.

A stride of a memory access pattern may be intermixed with other strides. However, along with memory region information received from the host 100, application information and the like may also be recorded in the memory access pattern storage circuit 250, so that the stride of the memory access pattern can be distinguished from other strides. The recorded information may indicate how the memory allocated to a process is divided, and the use (such as text, data, heap, or stack) intended for each division of the allocated memory. The application information may be used to distinguish between processes, that is, to distinguish memory accesses of one process from memory accesses of other processes.

The remaining constituent elements and operations of the memory device 200_1 shown in FIG. 5 are substantially identical to those of the memory devices 200 shown in FIG. 2, and as such a detailed description thereof will herein be omitted for convenience of description.

Figure 6:
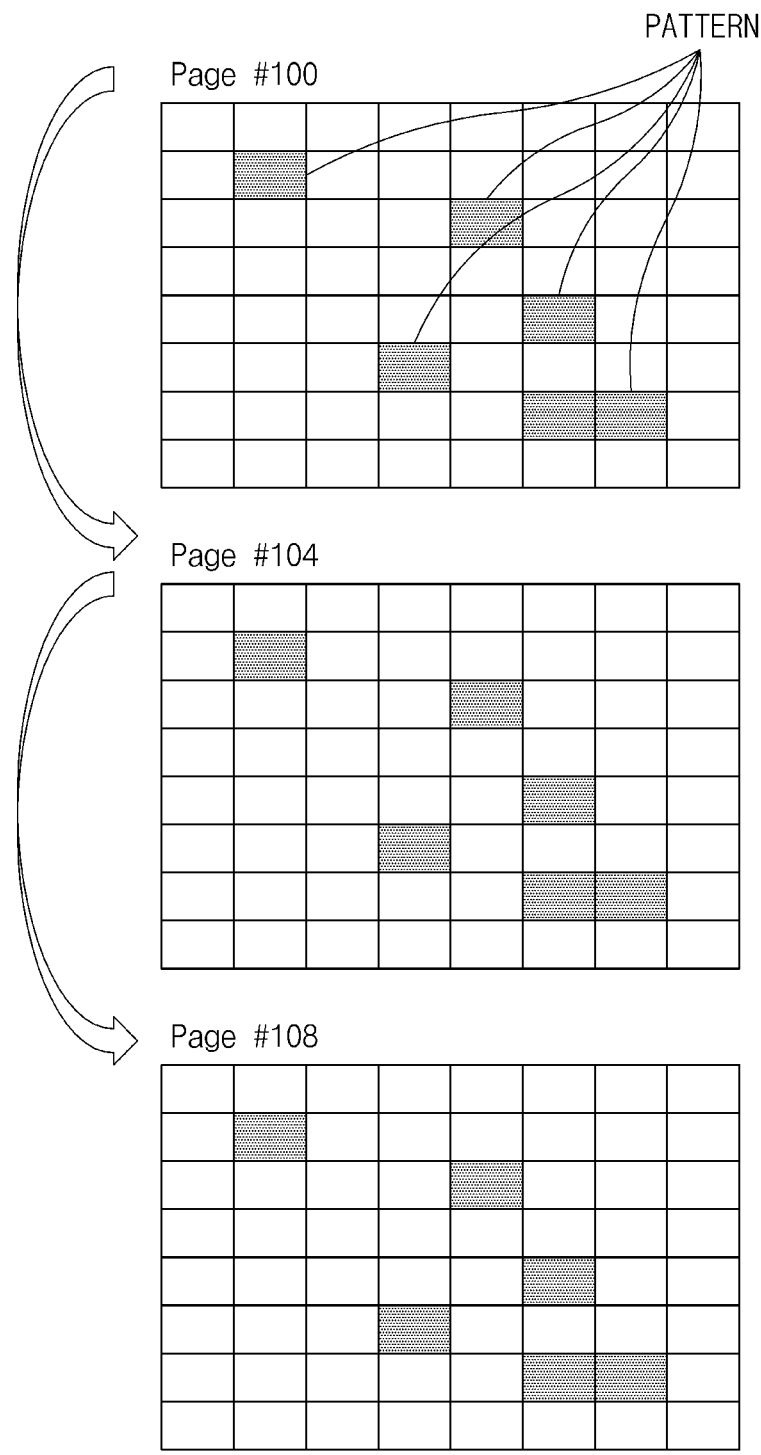
FIG. 6 illustrates a profile process of a host according to an embodiment of the present disclosure.

FIG. 6 illustrates a profile process of the host 100 shown in FIG. 2, such as may be performed by the profiler 120. Operations of FIG. 6 will hereinafter be described with reference to the embodiment of FIG. 2. However, in another embodiment, the operations similar to those described below may also be performed by the memory profile circuit 260 of FIG. 5 in the memory device 200_1 of FIG. 4.

The profiler 120 of the host 100 may read information stored in the access pattern storage circuit 110. The profiler 120 may profile history information of a previous memory access pattern, and may thus generate memory information INFO based on the profiled history information.

For example, the profiler 120 may profile pattern information of data accessed at page #100, pattern information of data accessed at page #104, and pattern information of data accessed at page #108. From the viewpoint of history information of the previous memory access pattern, it can be recognized that data requisite for the host 100 is some data of the page, but not all the data of the page.

If data accessed at page #100, data accessed at the page #104, and data accessed at page #108 are identical in location to each other, the host 100 may generate the corresponding access pattern as memory information INFO, and may transmit the generated memory information INFO to the memory devices 200. For example, if, as shown in FIG. 6, the host 100 access data within each of pages #100, #104, and #108 at offsets of 9, 20, 37, 43, 53, and 54, then in an embodiment the memory information INFO would indicate an access pattern including 9, 20, 37, 43, 53, and 54. In an embodiment, the memory pattern might apply only to pages having numbers equal to 100+4N, where N is an integer greater than or equal to 0.

Figure 7:
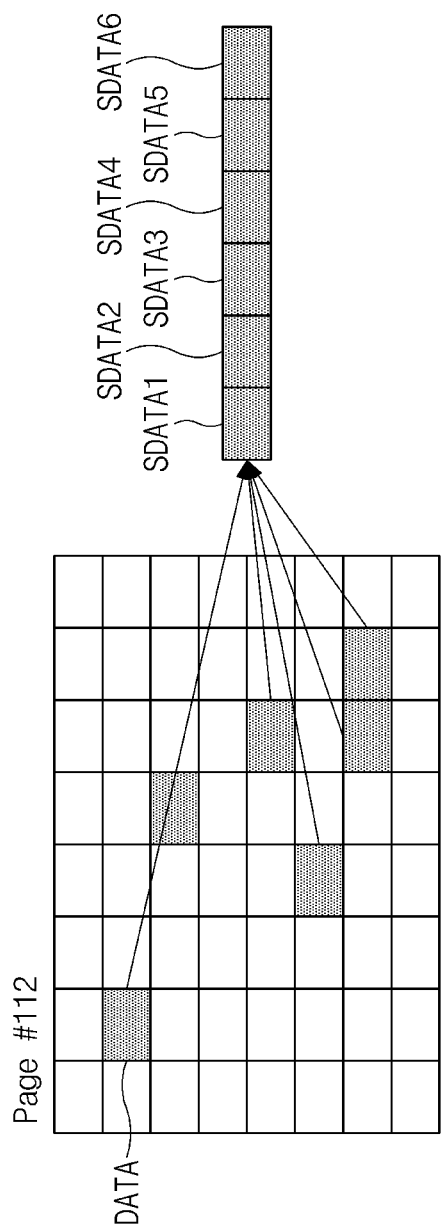
FIG. 7 is a conceptual diagram illustrating a data prediction process of the memory device shown in FIG. 3 according to an embodiment of the present disclosure.

FIG. 7 is a conceptual diagram illustrating a data prediction process of each memory device 200 shown in FIG. 3. Operations of FIG. 7 will hereinafter be described with reference to the embodiment of FIG. 3, however, embodiments are not limited thereto, and similar operations to those described below may occur in each memory device 200_1 of FIG. 5.

The data prediction circuit 230 of each of the memory devices 200 may predict a data pattern to be accessed at a subsequent page in response to memory information INFO received from the profiler 120.

For example, memory information INFO received from the profiler 100 may include specific information indicating that the memory access pattern at page #100, the memory access pattern at page #104, and the memory access pattern at page #108 are identical in location to each other. From that it is determined that the application of the host 100 tends to access the memory devices 200 using regular patterns. Accordingly, the data prediction circuit 230 may predict that data DATA corresponding to the same relative locations as were previously accessed in page #100, page #104, and page #108 will be accessed at a subsequent page #112.

The data prediction circuit 230 may generate subset data SDATA predicted to be required by the host 100 in response to a request for data DATA of the predicted page. The subset data SDATA generated by the data prediction circuit 230 may be transmitted to the host 100 through the interface 210. For example, when data about only one cache line is requested, the data prediction circuit 230 may transmit all the packets of the subset data SDATA to the host 100. In an embodiment, each packet of the transmitted subset data SDATA includes data having a size corresponding to a cache line from respective locations in the memory core 240 indicated by the memory information INFO.

If necessary, the data prediction circuit 230 may also adjust or control the amount of transmitted subset data SDATA in consideration of a reception speed of the command signal CMD generated by a data request from the host 100. For example, when the command signal CMD from the host 100 is received at low speed, the data prediction circuit 230 may reduce the amount of transmitted subset data SDATA. In an embodiment, the amount of transmitted subset data SDATA is reduced in order to complete the transmission of the subset data SDATA before a subsequent command signal CMD is received.

Meanwhile, the host 100 may recognize information about where the subset data SDATA is located in one or more pages of the memory devices 200. That is, when the controller 220 of each memory device 200 transmits the subset data SDATA to the host 100, the controller 220 may also transmit format information of the subset data SDATA.

For example, the controller 220 may include information about a distance to each subset data SDATA in the format information, and may transmit the resultant format information including the distance information to the host 100. A format of the distance information about the subset data SDATA may indicate how far the corresponding subset data SDATA is spaced apart from another subset data SDATA. That is, the format applied to the host 100 may include "Value of Subset Data SDATA" and "Information about Distance to Previous Subset Data SDATA".

For example, it is assumed that the number of subset data SDATA is set to 6 for convenience of description. Thus, the format of the subset data SDATA may be set to "{(9, SDATA1),(11,SDATA2),(17,SDATA3),(6,SDATA4),(10, SDATA5), (0,SDATA6)}". In each parenthesis of the above-mentioned
{(9,SDATA1),(11,SDATA2),(17,SDATA3),(6,SDATA4), (10,SDATA5),(0,SD ATA6)} format, a former number (9, 11, 17, 6, 10, 0) may indicate the distance to previous subset data SDATA, and a latter number (SDATA1-SDATA6) may indicate a value of subset data SDATA.

The controller may transmit the above-mentioned data format to the host 100. Therefore, the host may recognize location information of the subset data SDATA in each page of the memory devices 200.

Although the format of the subset data SDATA shown in FIG. 7 has been established as described above, the scope of the format of the subset data SDATA the present disclosure is not limited thereto.

Figure 8:
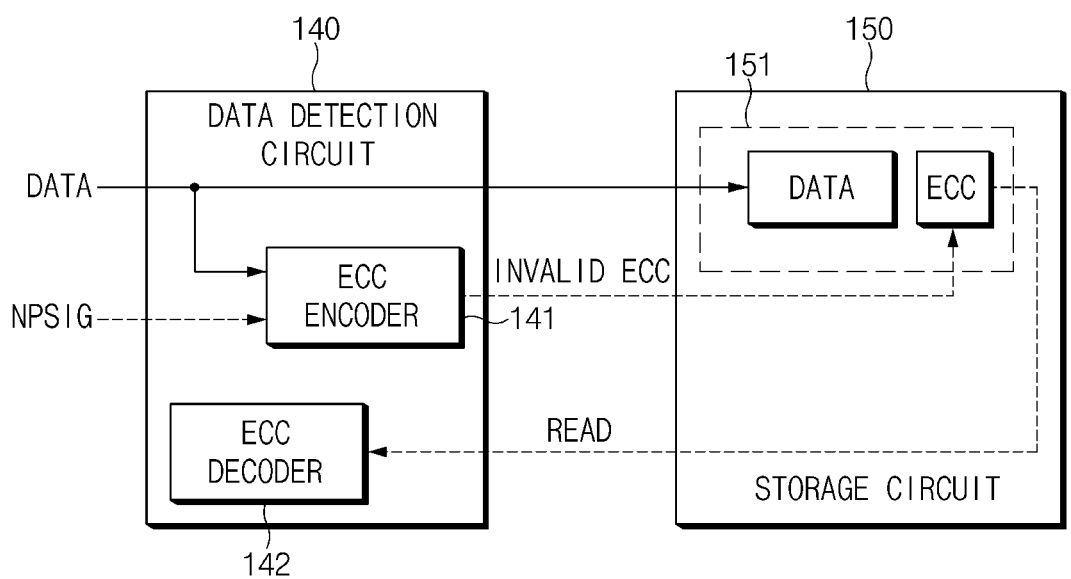
FIGS. 8 and 9 illustrate operations of a data detection circuit according to an embodiment of the present disclosure.
Figure 9:
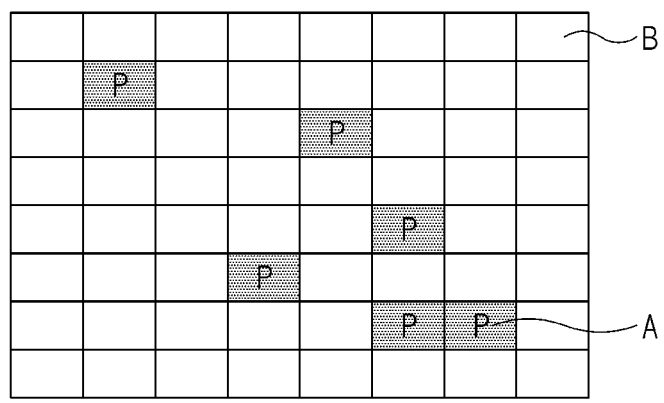

FIGS. 8 and 9 illustrate operations of a data detection circuit 140, such as the data detection circuit 140 shown in FIG. 2, according to an embodiment.

The data detection circuit 140 may include an Error Correction Code (ECC) encoder 141 and an ECC decoder 142. The storage circuit 150 may store not only data DATA but also an ECC received from the ECC encoder 141 in a cache line 151. The ECC can be an invalid ECC, that is, an ECC that is not equal to the calculated result of the ECC algorithm as applied to the data DATA.

A method for storing the subset data SDATA in the storage circuit 150 using the data detection circuit 140 will hereinafter after be described in detail.

The host 100 may allocate an empty page to the storage circuit 150 so as to write data received from the memory devices 200. The data detection circuit 140 may allocate invalid data to all data fields of the corresponding page of the storage circuit 150.

The data detection circuit 140 may receive the subset data (SDATA) format from the memory devices 200 through the controller 220. The data detection circuit 140 may analyze the received data format, and may discriminate between "Value of Subset Data SDATA" and "Distance to Previous Subset Data SDATA". The data detection circuit 140 may store the subset data SDATA in the allocated location of the storage circuit 150 by referring to the distance information about each subset data SDATA.

Meanwhile, a method for determining a non-present region from among the pages of the storage circuit 150 using the data detection circuit 140 will hereinafter be described with reference to the attached drawings.

For convenience of description and better understanding of the present disclosure, it is assumed that the host 100 performs the write operation of data from a specific address in units of a cache line 151 in the storage circuit 150, that is, if the cache line 151 can store N bytes of data, the host 100 performs the write operations in blocks of N bytes. The cache line 151 may be one of a plurality of cache lines in the storage circuit 150, each cache line including data storage, address tag storage, and storage for an Error Correction Code (ECC). Upon receiving a non-present detection signal NPSIG, the ECC encoder 141 may encode the data to generate an invalid error correction code (ECC), and may store the generated invalid ECC in a cache line 151 to mark the cache line 151 as not including valid data. In other words, the data detection circuit 140 may intentionally generate an invalid ECC through the ECC encoder 141, and may output the invalid ECC to the storage circuit 150 to indicate that the cache line does not presently store valid data.

During the read operation, the invalid ECC stored in the cache line 151 may be transmitted to the ECC decoder 142. The ECC decoder 142 may decode the ECC read from the corresponding cache line 151. The data detection circuit 140 may determine whether valid data is present in the cache line 151 according to the result produced by the ECC decoder 142.

The data detection circuit 140 may also detect the presence or absence of errors based on the decode result of the ECC decoder 142. If the decode result indicates an error but is not identical to the intentional invalid ECC, the data detection circuit 140 may determine that the detected error is an actual fault, that is, that the data and/or the ECC values read from the cache line 151 is not the same as the data and/or ECC values that were stored in the cache line 151. That is, the data detection circuit 140 may determine whether the intentional invalid ECC previously stored into the cache line 151 has been detected or whether an actual fault has been default. The ECC encoder 141 may receive a non-present detection signal NPSIG as an input, and may thus encode the ECC using the received non-present detection signal NPSIG. Therefore, if the non-present detection signal NPSIG is activated (or enabled), the data detection circuit 140 may determine that an error has occurred in the intentional invalid ECC.

For example, the ECC encoder 141 may receive data DATA and an ECC corresponding to the data DATA. If a predetermined ECC bit corresponding to the corresponding data DATA is set to "0", the ECC encoder 141 may encode an invalid ECC by changing the predetermined ECC bit set to "0" into "1", and may store the encoded result in the cache line 151. Subsequently, the data detection circuit 140 may decode the ECC stored in the cache line 151, and may compare the decoded ECC with an original ECC bit. In an embodiment, the original ECC bit is generated by ECC encoding the data stored in the cache line 151.

If an ECC bit decoded by the ECC decoder 142 is set to "0", when the original ECC bit was also set to "0", this means that data has already been stored in the cache line 151 such that the region corresponding to the ECC bit "0" is considered to be a present region. In contrast, if an ECC bit decoded by the ECC decoder 142 is set to "1", when the original ECC bit was also set to "0", this means that data has not been stored in the cache line 151 such that the region corresponding to the ECC bit "1" is considered to be a non-present region. That is, when an ECC value stored in a cache line differs from an ECC value generated by ECC encoding the data stored in the cache line in a predetermined way, this is interpreted as meaning that valid data has not been stored in the cache line 151 and the corresponding region is considered to be a non-present region.

Referring to FIG. 9, the data detection circuit 140 may display information about whether data is stored in the cache line 151 using a bitmap. For example, if an ECC error has occurred, this means that the corresponding region is a non-present region in which no data is stored, such that each of the non-present regions is denoted by B (that is, a bit value represented by a blank) of FIG. 9. Here, "B" may denote invalid data. In contrast, if no ECC error has occurred, this means that the corresponding region is a present region in which data is stored, such that each of the present regions is denoted by A (that is, a bit value represented by the character "P") of FIG. 9.

In an embodiment, the data detection circuit 140 may have a specific rule to discriminate between an intended ECC error and an actual memory error. For example, in an embodiment the specific rule may be denoted by "+1". In the case of using the specific rule "+1", when a correct ECC encoding of data is "C", an ECC value of "C+1" may be generated to indicate the non-present data. Thereafter, if the complementary rule "−1" is applied to ECC check processing, it can be confirmed that the corresponding region is a non-present region and not an ECC error resulting from a fault or corruption of the memory store. That is, if the rule "+1" is used to generate ECC indicating a non-present regions, then when an ECC check of a cache line generates a value equal to the stored ECC value thereof, the data detection circuit 140 determines that data is present and correct in the cache line; when the ECC check generates a value equal to the stored ECC value minus 1, the data detection circuit 140 determines that the non-present region is indicated for the cache line, and when the ECC check generates a value equal to any other value, the data detection circuit 140 determines that an error occurred in reading the cache line.

That is, since the host 100 is designed to access the memory devices 200 in units of a page, the host 100 may have difficulty in accessing regions contained in each page. Accordingly, from the viewpoint of the host 100, the host 100 may have difficulty in deciding the presence or absence (for example, in the storage circuit 150) of a non-present region in each page of the memory devices 200. Thus, the memory system according to the embodiments of the present disclosure may detect non-present data in the host 100 through the data detection circuit 140.

As is apparent from the above description, the memory system according to the embodiments of the present disclosure may increase a data transfer rate by reducing overhead.

Those skilled in the art will appreciate that the embodiments may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description. Further, all changes coming within the meaning and equivalency range of the appended claims are intended to be embraced therein. In addition, it is obvious to those skilled in the art that claims that are not explicitly cited in each other in the appended claims may be presented in combination as an embodiment or included as a new claim by a subsequent amendment after the application is filed.

Although a number of illustrative embodiments have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. A memory system comprising:
   a host configured to generate memory information by profiling history information about a memory access pattern; and
   at least one memory device configured to predict a data pattern of a page to be accessed by the host using the memory information, generate subset data and format information indicating location information of the subset data from the page according to the predicted data pattern,
   wherein the subset data is less than all the data of the page,
   wherein the memory device comprises:
      a data prediction circuit configured to predict the data pattern in response to the memory information, and generate the subset data and the format information as packetized subset data of the page; and
      a controller configured to analyze and process a command signal received from the host, and transmit the generated subset data and format information to the host, and
   wherein the host comprises a data detection circuit configured to detect data of a non-present cache line in response to data transmitted to or received from the memory device and in response to the subset data and the format information received from the memory device.

2. The memory system according to claim 1, wherein the host comprises:
   a profile circuit configured to generate the memory information by profiling history information about the memory access pattern; and
   a host controller configured to generate a request command for requesting data of the page from the memory device.

3. The memory system according to claim 2, wherein:
   the memory device is configured to transmit the subset data of the page to the host in response to receiving the request command from the host.

4. The memory system according to claim 2, wherein the host further comprises:
   an access pattern storage circuit configured to store history information about the memory access pattern.

5. The memory system according to claim 2, wherein the profile circuit is configured to profile the memory access pattern in response to information about a kernel level of each memory region of the memory device, information about an application level of each memory region of the memory device, or both.

6. The memory system according to claim 2, wherein the profile circuit is configured to extract the memory access pattern by analyzing an inter-page access pattern, an intra-page access pattern, or both.

7. The memory system according to claim 2, wherein the host further comprises:
   a storage circuit configured to store the data and the subset data in the cache line.

8. The memory system according to claim 7, wherein the data detection circuit comprises:
   an error correction code (ECC) encoder configured to encode an error correction code (ECC) and to generate an invalid ECC in response to receiving a non-present detection signal; and
   an error correction code (ECC) decoder configured to read the error correction code (ECC) stored in the storage circuit, and decode the read ECC.

9. The memory system according to claim 8, wherein the storage circuit is configured to store the data and the invalid error correction code (ECC) in the cache line.

10. The memory system according to claim 8, wherein the data detection circuit is configured to determine a presence or absence of valid data in a cache line by comparing the error correction code (ECC) stored in the cache line with an ECC generated from the data stored in the cache line.

11. The memory system according to claim 1, wherein the memory device further comprises:
    a memory core configured to store data during a write operation or read data during a read operation upon receiving a control signal from the controller.

12. The memory system according to claim 11, wherein the data prediction circuit is configured to predict the data pattern through pattern learning.

13. A memory system comprising:
    a memory device;
    a memory profile circuit configured to generate memory information by profiling history information about a memory access pattern;
    a data prediction circuit configured to predict a data pattern of a page to be accessed by the host using the memory information, and generate subset data and format information indicating location information of the subset data from the page according to the predicted data pattern, the subset data being less than all the data of the page;

a memory access pattern storage circuit configured to store history information about the memory access pattern; and a controller configured to analyze and process a command signal received from a host, and transmit the generated subset data and format information to a host, wherein the memory profile circuit, the data prediction circuit, and the memory access pattern storage circuit are included in the memory device.

14. The memory system according to claim 13, wherein the memory device comprises:

a memory core configured to store data during a write operation or read data during a read operation upon receiving a control signal from the controller.

15. The memory system according to claim 14, wherein the memory access pattern storage circuit is configured to store the history information in response to a stride of a virtual address.

16. The memory system according to claim 14, wherein the memory access pattern storage circuit is configured to store at least one of memory region information and application information.

17. The memory system according to claim 16, wherein the controller is configured to receive a data request in units of a cache line.

18. The memory system according to claim 13, wherein the memory profile circuit is configured to profile the memory access pattern in response to information about a kernel level of each memory region of the memory device, information about an application level of each memory region of the memory device, or both.

19. The memory system according to claim 13, wherein the data prediction circuit is configured to predict the data pattern through pattern learning.

* * * * *